United States Patent [19]

McKendree, Jr. et al.

[11] 3,748,892

[45] July 31, 1973

[54] HIGH PRECISION DILATOMETER

[75] Inventors: Jesse R. McKendree, Jr.; John R. Koenig, both of Dayton, Ohio

[73] Assignee: The United States of America as represented by the Secretary of the Air Force, Washington, D.C.

[22] Filed: Apr. 18, 1972

[21] Appl. No.: 245,151

[52] U.S. Cl. .................................................. 73/16
[51] Int. Cl. ........................................... G01n 25/16
[58] Field of Search ......................................... 73/16

[56] References Cited
UNITED STATES PATENTS

| 1,444,568 | 2/1923 | Sperr, Jr. ............................... | 73/16 |
| 1,489,115 | 4/1924 | Chevenard............................. | 73/16 |
| 3,271,996 | 9/1966 | Paulik et al............................. | 73/15 |

FOREIGN PATENTS OR APPLICATIONS

| 1,134,086 | 11/1968 | Great Britain.......................... | 73/16 |

OTHER PUBLICATIONS

Bowles et al., "An Automatic Recording Dilatometer" in Journal of Scientific Instruments, Vol. 40, 1963, pg. 117–120.

Primary Examiner—Herbert Goldstein
Attorney—Harry A. Herbert, Jr. et al.

[57] ABSTRACT

A dilatometer including a furnace, a double bar support positioned within an evacuated tube mounted in the furnace, and supporting a test specimen and an elongated push rod in contact with the specimen and extending outside the furnace into an evacuated bell jar containing a linear variable, differential transformer with its movable core placed in contact with, and adjustable by the movement imparted to the push rod by the thermal expansion of the specimen to thereby produce a voltage directly proportional to such movement and constituting the exact measure of said expansion.

3 Claims, 6 Drawing Figures

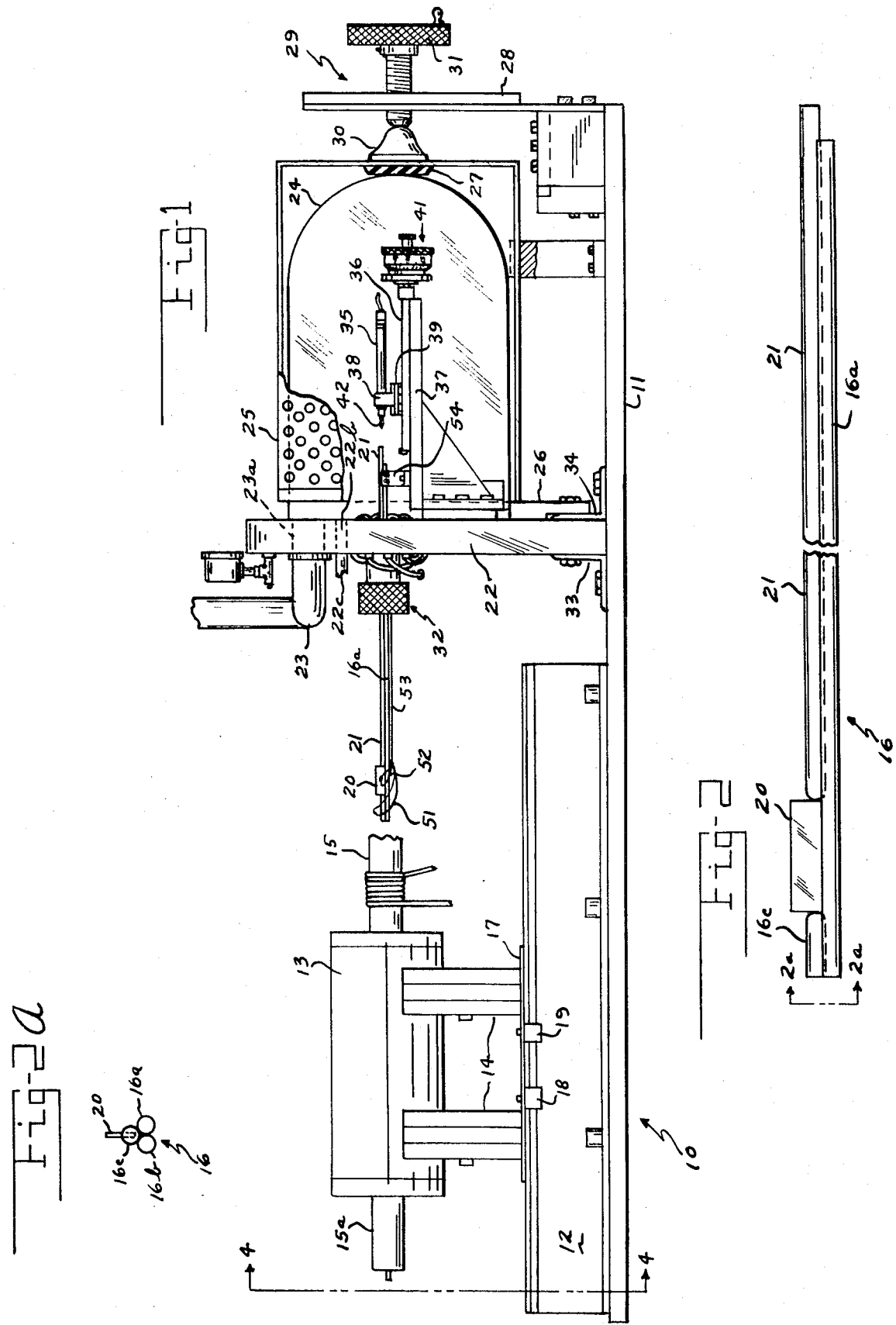

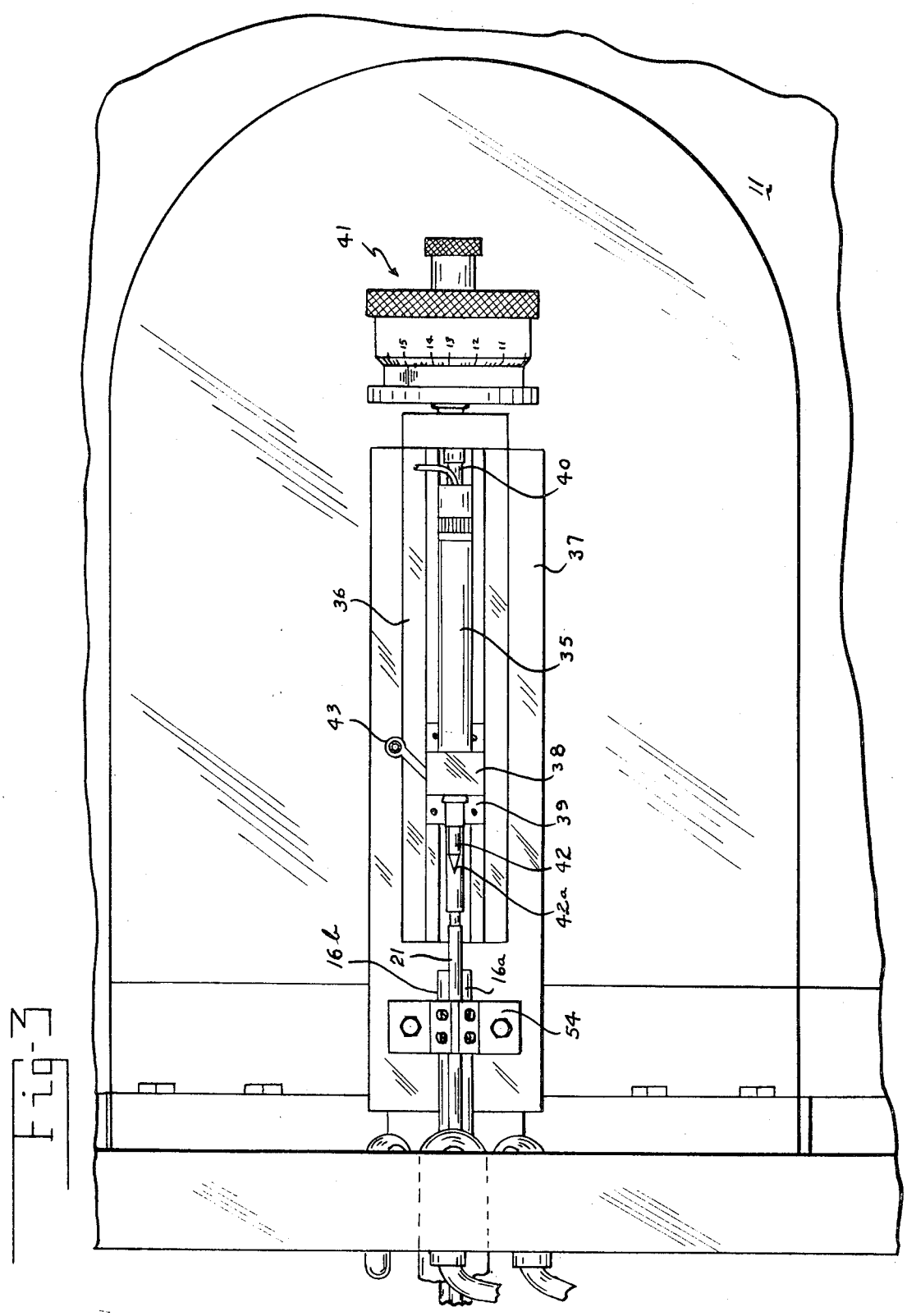

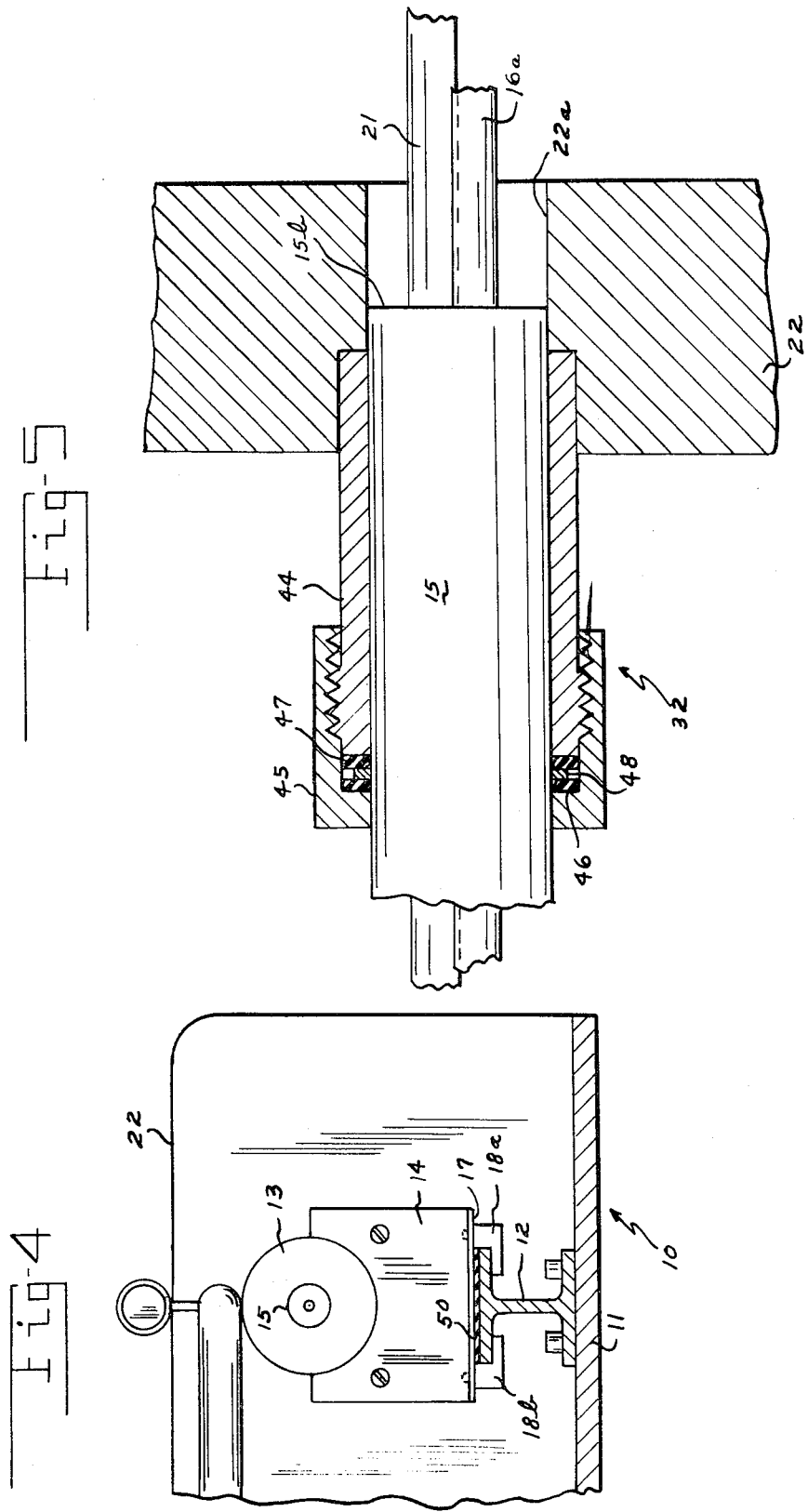

HIGH PRECISION DILATOMETER

BACKGROUND OF THE INVENTION

This invention relates generally to the measurement of thermal expansion and, in particular, to an improved dilatometer apparatus.

In previously-designed thermal expansion-measuring devices, dilatometers equipped with strain gages have been frequently used in conjunction with thermocouples to measure the expansion and/or volumetric changes of selected test specimens. In such devices, the position of a needle on a measuring instrument has been controlled by the action of one thermocouple, while a second therocouple has been used to control the operation of a furnace. One problem involved with the use of a strain gage is that of isolating the inherent errors resulting in the thermal expansion data being so obtained from the effect of the test temperature on both the strain gage itself and on the mounting means therefor.

Other thermal expansion-measuring system have involved a rather complicated arrangement of mirrors that are actuated by the expansion movement being thermally imparted to the test specimen to thereby produce a deflected beam of collimated light that is concentrated on a rotary drum incorporating light-sensitive paper on its surface. The disclosure in U.S. Pat. No. 3,271,996 is an example of this type of thermal expansion measurement. However, such mirror-operated systems have generally proven to be relatively incapable of measuring or accurately responding to relatively rapid changes in temperature. In still another kind of thermal expansion measuring device, such as that illustrated in U.S. Pat. No. 2,478,895, vertically-disposed rod member, as at 14, is used to actuate a measuring circuit. The said rod member 14 is shown mounted within a cylindrical element 13 that is fixed at one end of a base member 15 and which incorporates a flange 16 at its other end. Rod member 14 also incorporates a flange 17 that is spaced-apart from, and thereby provides a space with the flange 16 for the positioning of a test specimen 18 therebetween. Since the rod member 14 extends through the space provided between the flanges 16 and 17 and is also mounted in concentric relation within the member 13, the test specimen 18 is taught as being preferably made in the form of a hollow thin-walled cylinder through which said rod member 14 passes. This arrangment is, of course, rather expensive and severely limits or restricts the size and shape of the test specimen. On the other hand, the thermal expansion-measuring apparatus of the present invention offers significant improvement and advantage over the above-described, previously-developed devices by its use of a novel double bar-specimen support, the use of which greatly facilitates the testing of specimens of various sizes and shapes in a unique and simplified manner, as will appear self-evident hereinafter in the following summary and detailed description, along with certain other advantages not disclosed in the aforementioned previously-described thermal expansion-measuring arrangements.

SUMMARY OF THE INVENTION

The present invention consists briefly in a new and improved dilatometer device that incorporates, in part, a furnace, an evacuated tube extending through the furnace, and an elongated double-bar support for supporting the test specimen in horizontal relation thereon. A push rod also rest horizontally on the double bar support with one end in contact with the specimen and its other end extending into an evacuated bell jar for contact with the movable core member of a linear variable differential transformer calibrated to produce a voltage in direct proportion to the degree of linear movement imparted to the push rod by the thermal expansion of the test specimen.

Inherent objects and advantages of the above-outlined invention will readily appear hereinafter in connection with the following disclosure, taken in connection with the accompanying drawings, in which:

BREIF DESCRIPTION OF THE DRAWINGS

FIG. 1 is a longitudinal view, in side elevation, of the overall dilatometer apparatus of the present invention;

FIG. 2 is a second longitudinal view, in side elevation, showing additional details of the unique double bar-specimen holder of the overall dilatometer of FIG. 1;

FIG. 2a is an end view, looking in the direction of the arrows 2a—2a in FIG. 2, illustrating further details of the double bar-specimen holder;

FIG. 3 is a partly broken-away, top view of the adjustaboe support means for the linear variable, differential transformer used with, and as part of the overall dilatometer of FIG. 1;

FIG. 4 is another end view, partly broken-away, illustrating details of the slidable mounting means intermediately positioned between, and supporting the dilatometer-furnace to a main, supporting base place member thereof; and FIG. 5 is a relatively enlarged view, partly broken-away and in section, of the unique combined compression fitting and O-ring seal used on, and attaching one end of, an enclosure tube-portion of the invention to a vertically-disposed brass plate member thereof.

DESCRIPTION OF THE PREFERRED EMBODIMENT

Referring generally to the drawings and, in particular, to FIG. 1 thereof, the new and improved dilatometer apparatus of the present invention has been indicated generally at 10 as including in part a preferably 1 inch aluminum, main supporting-base plate member 11 that may be supported horizontally on a suitable preferably aluminum table and which may further be 60 inches in length by 15 inches in width, a steel flanged or I-beam member 12, 4 ⅛ inches in height by 4 inches in width and having a teflon top surface, and being rigidly supported on top of said base plate member 11, a platinum-wound furnace 13 slidably supported on said I-beam member 12 in a novel and simple manner to be further described hereinafter in specific connection with FIG. 4, and a horizontally-oriented, alumina vacuum enclosure tube 15 that may be rigidly affixed to, and centrally disposed within said furnace 13 by suitable attachment means (not shown). Said enclosure tube 15 may be clamped to the furnace 13 and connected, at its right end portion 15b (FIG. 5) by a combined and uniquely applied compression fitting and O-ring seal, indicated generally at 32 in FIGS 1 and 5, to a relatively enlarged brass plate 22. Its left end portion 15a extends outside one end of the furnace 13 and, after evacuation of said tube, is suitably vacuum-sealed. Brass plate 22, which may be water-cooled by suitable means not shown is rigidly supported in upright, vertical disposition on the base plate member 11 by means of a pair of identical support angles 33 and 34 disposed on opposite sides thereof.

The aforementioned furnace 13 is appropriately and uniquely supported on, and slidably adjustable relative to the I-beam member 12 by means of a plurality of a cradle-type of furnace support elements, as is indicated generally at the reference numeral 14 in FIG. 1. The furnace support elements 14 may be bolted or otherwise rigidly affixed in upright relation on a preferably rectangular-shaped furnace slide plate 17 to the bottom surface of which may be rigidly affixed a double pair of spaced-apart aluminum toe clamps, as is indicated generally at 18 and 19 in FIG. 1. As is seen particularly in FIG. 4, oppositely-disposed toe clamp portions 18a and 18b of the toe clamp 18 are naturally faced inwardly towards each other, and respectively straddle and are slidably supported to the underside of the opposite side rail portions of the upper or top surface of the I-beam member 12. The teflon surface on the said I-beam member is indicated at 50. With the foregoing arrangement, the furnace 13 and, of course, the enclosure tube 15 clamped thereto are uniquely supported for slidable movement in a horizontal direction, relative to, and on the I-beam member 12, in a controlled and restrained manner to thereby prevent any damage that might otherwise have resulted from its movement between a disconnected or separated, non-testing position and a connected, testing position, as will hereinafter be further described in specific regard to the previously-noted compression fitting and O-ring seal 32.

Mounted within the above-referred to alumina enclosure tube 15 is the new and novel double bar-test specimen holder 16 that forms a key feature of the present invention. The forward, or left-hand end of the specimen holder 16, as viewed in the depiction thereof in FIG. 1, would normally extend partly into the furnace 13 inside the aforesaid enclosure tube 15, when the said furnace and tube are in their testing or, in other words, fully assemblied position. However, in the illustrations of FIGS. 1 and 3, the furnace 13 and tube 15 are shown in their adjusted position to the left, as viewed in FIG. 1, which position constitutes the non-testing position and allows for easy access to the test specimen, one example of which being seen at 20. The aforesaid specimen holder 16 actually consists in a double bar arrangement, as noted hereinbefore, that includes a pair of identical, parallel and elongated quartz bars, indicated respectively at 16a and 16b in FIG. 2a as being cylindrical in shape, which are fused together to thereby provide a common and extremely stable horizontal support for the specimen 20. In addition to the elongated bars 16a and 16b, the unique double bar support 16 incorporates on its left-hand end, and extremely short, quartz bar, at 16c (Note FIG. 2), which acts as a stop against which one end of the test specimen 20 rests. With this simplified arrangement, the testing of specimens having a variety of sizes and shapes may be easily and quickly accommodated, merely by simply resting or placing each specimen to be tested, in turn, on top of the fused together quartz bars 16a and 16b of the double bar support 16 in contact against the bar stop 16c. Thereafter, another unique and key feature of the invention; namely, an elongated quartz push rod, indicated at 21 as being of similar cylindrical shape, is likewise placed in simple, resting position on top of the quartz bars 16a and 16b, with its left-hand end contacting the test specimen 20.

The right end portions of the quartz bars 16a and 16b and that of the quartz push rod 21 all extend through the enclosure tube 15 and the brass plate 22 in overlapping relation into a bell jar 24 (Note FIG. 1) where they are rigidly supported by a specimen holder support and clamp means, indicated generally at 54, to a main, supporting Invar table 37. The push rod 21 extends into the said bell jar 24 at an even greater distance than the ends of the fused bars 16a and 16b to a position in relatively close proximity to one end of a linear variable, differential transformer 35 that is housed within the bell jar 24 as shown. The transformer 35 may be slidably and directly supported on an intermediately positioned table 36 that is, in turn, rigidly supported on the said main and transformer-indirect supporting Invar table 37, which Invar table 37 is shown as being bolted to, and thereby supported by the brass plate 22. As more clearly illustrated in FIG. 3, the differential transformer 35 is directly supported to a top transformer-holder member 38 which may incorporate a centrally disposed and screw threaded opening (not shown) for this purpose. The holder member 38 may, in turn, be supported to, or incorporated on top or in upright relation to, a bottom-disposed or base support element 39 that is adjustably supported on the elongated screw element 40 of a micrometer, indicated generally at 41, and which is centrally disposed and supported within and by the table 36. In the views of FIGS. 1 and 3, the differential transformer 35 is shown with a core member at 42 which is, of course, by definition moveable and which further incorporates a knife edge portion 42a (Note FIG. 3) that is shown in the aforesaid FIGS. 1 and 3 as being out of contact with the end of the push rod 21. However, the transformer-holder means 38 and 39 may be easily adjustable to place the said movable core member-knife edge portion 42a in point contact with the right end of the push rod by use of the micrometer at 41.

Before the aforementioned adjustment of the linear variable differential transformer 35, initially the furnace 13 and, of course, the enclosure tube 15 clamped thereto may be quite easily and quickly slidably positioned to the left, as viewed in FIG. 1, for example, by virtue of the previously-described, unique slidable mounting means existing between the furnace slide plate 17 and the I-beam member 12. In addition, the enclosure tube 15 has been uniquely connected, in quickly releasable manner, to the brass plate 22 by the previously-referred to combined and novel compression fitting and O-ring seal 32. With specific reference to FIG. 5, it is clearly seen that the said combined compression fitting and O-ring seal 32 comprises a relatively elongated compression fitting-body portion at 44, one end of which may be press-fitted or otherwise vacuum sealed to, and within, a relatively enlarged portion of an opening, indicated generqally at 22a as being formed within, and extending through the brass plate 22. Said compression fitting-body portion 44 has been illustrated as incorporating an externally threaded portion adjacent is outer end on which an internally threaded-compression nut portion 45 may be adjustably positioned. Extending between and in relatively snug-fitting relation thereto is the enclosure tube 15, which, of course, encloses the double bar-specimen holder 16 and the push rod 21 carried thereby. The end of the enclosure tube 15 is specifically releasable held within the opening 22a of the brass plate 22 by means of a pair of O-ring seals, indicated respectively at 46 and 47, which are shown held spaced apart by the spacer element 48 and in compressed and sealed relation between the compression nut portion 45 and the outside circumference of the enclosure tube 15 to thereby connect the latter to the brass plate 22. Thus, when it is desired to place a test specimen, as at 20, in its proper position on the double bar-specimen support 16, or, alternatively to remove it therefrom the compression nut portion 45 is easily loosened from its adjustment on the body portion 44 to thereby relieve the compressed relation of the O-ring seals 46 and 47 against the circumference of, and thus releasing the previously tight and vacuum sealed connection with the end of the enclosure tube 15. It is then only necessary to quickly slide the furnace 13 and enclosure tube 15 away from the brass plate 22 and thus expose to view the double bar-specimen holder 16, the push rod 21 and the specimen 20. Of course, accidental movement of the double bar-specimen holder 16 therewith is prevented by virtue of the right end of the said holder 16 being clamped in supporting relation on the Invar table 37 by the previously-noted support and clamp means at 54 (Note FIG. 1).

Upon emplacing a test specimen, as at 20, in its proper position on the double bar-specimen holder 16 with one end against the bar stop 16c and the appropriate end of the push rod 21 resting thereagainst, the furnace 13 and enclosure 15 are, again, easily and quickly repositioned, to the right, as viewed in FIG. 1, by means of manually sliding them on the top rail teflon surface of the I-beam member 12 until the enclosure tube 15 has entered the opening 22a of the brass plate 22 a sufficient distance to allow the reengagement therewith of the compressed O-ring seals 46 and 47 by the tightening adjustment of the compression nut portion 45 on the body portion 44 of the combined compression fitting and O-ring seal 32. At this point, the knife edge 42a (FIG. 3) of the movable core member 42 may be brought into point contact with the right end of the push rod 21. First, however, gross changes in the position of the transformer 35 may be effected by the release of a clamping lever, indicated at 43 in the aforesaid FIG. 3, which clamping lever 43 normally provides a positive hold between the bottom support element 39 for the transformer 35 and the screw element 40 of the micrometer 41. After manually sliding the transformer 35 to its approximately correct position, the clamping lever 43 is returned to its clamping position and further micrometer adjustment is made by operation of the micrometer 41 to bring the knife edge portion 42a into precise contact with the right end of the push rod 21.

After adjusting the differential transformer 35 with its movable core member 42 in exact point contact with the push rod 21, the previously-noted bell jar 24 is then placed in its correct position over the transformer 35 with its open end portion installed against the right-hand side of the brass plate 22 (Note FIG. 1) and supported on its lower side by a cradle type support member, at 26, which may be suitably bolted to the brass plate 22 through a common bolt means that also affixes the support angles 33 and 34 thereto. The brass plate 22 may also incorporate a vacuum line at 23 that engages in a suitable fitting opening 23a extending through the plate in communication with the interior of the bell jar 24. By these means, after mounting the bell jar 24 to the side of the brass plate 22, the chamber within the said bell jar may be evacuated to thereby place the differential transformer 35 and its thermal expansion-measuring action in the uniformity of a vacuum environment, or, alternatively, the bell jar may be evacuated to provide pure inert gas environments therewithin through use of an inert gas feed line, indicated at 22c, for introducing inert gas through the plate-opening 22b.

To facilitate its sealed relation to the side of the brass plate 22 on its evacuation, the circumferential edge of the open end portion of the bell jar 24 forced against the brass plate may be equipped with a rubberized periphery (not shown) Also, to protect the bell jar 24 from possible damage by implosion, it may be protected by a perforated implosion shield, a broken-away portion of which being shown at 25. Furthermore, the bell jar 24 may be provided with a suitable support means for its closed or rear end portion that comprises a main upright and rearmost standard member 28 that may be releasably mounted on the rear or right hand end portion of the base plate member 11, and a screw-threaded and handle-operated member 29 that includes a rear end-engaging element 30 designed to contact the rear side of the implosion shield 25 directly behind the rear or closed end of the bell jar 24, and a handle element at 31 for adjusting the pressure being applied by the rear end-engaging element 30. To protect the rear end portion of the bell jar 24 against possible excessive pressure, a rubber cushion element 27 may be provided on the inside surface of the shield 25.

On positioning a test specimen, as at 20, in its proper place on the double bar-specimen holder 16, as noted hereinbefore, and then returning the furnace 13 and enclosure tube 15 to their proper testing position with, of course, the movable core member 42 of the transformer 35 and the evacuated bell jar 24 and implosion shield 25 appropriately positioned, the furnace 13 may then be activated to apply suitable amounts of heat to the test specimen 20. To control the heat of the furnace 13, a thermocouple may be employed in any well-known manner, as indicated generally at 51, with its sensing element placed in the general area over the bar stop 16c (Note FIG. 1). This thermocouple 51, which would have a relatively quick response to changes in temperature, would be placed in circuit with the furnace controller and act to control the temperature of the furnace to the desired value through means of a motor potentiometer that is also in circuit therewith. A second thermocouple, at 52, would be positioned with its sensing element disposed within, or otherwise contacting the test specimen 20 to thereby accurately sense and provide for the recordation of the actual temperatures to which the test specimen 20 would be raised at a given time. Of course, simultaneously therewith, the succession of varying voltages being produced by the various thermal expansions being imparted to the test specimen and transferred by the push rod 21 to the movable core member 42 of the differential transformer 35 would be likewise recorded. Both thermocouples 51 and 52 are shown disposed within a glass tube 53 that has been suitably attached to the underside of the double bar-specimen holder 16 for the sake of convenience and to properly insulate the thermocouple wires from the remainder of the test apparatus 10. In actual practice, thermal expansion data has been, and is being obtained through the use of the present apparatus on various aerospace materials such as graphite, carbon, refractory metal alloys and glassy carbons, and commercially available electronic data retrieval units are being used to automatically record the data so obtained.

We claim:

1. In a dilatometer apparatus for measuring the thermal expansion of one or more selected test specimens; a furnace for supplying predetermined amounts of heat to a selected test specimen; an intermediately-disposed, furnace-support means in direct, contacting relation with, and retaining said furnace in its required testing position; base support means mounting said furnace-support means thereto; test specimen-enclosing and vacuum sealing means fixedly supported within, and extending through opposing sides of said furnace to opposite end portions; test specimen-holding means extending from an inner end portion disposed within said test specimen-enclosing and vacuum sealing means within said furnace, to an outer end portion outside said third-named means and said furnace; evacuated means supported by said base support means and surrounding, enclosing and sealing one of said opposite end portions of said third-named means and the outer end portion of said fourth-named means; and thermal expansion-measuring, electrically-activated means mounted within said evacuated means and adapted to measure the thermal expansion of a test specimen by the production of a voltage directly responsive and proportional thereto; said test specimen-holding means mounting a selected test specimen of undetermined size and shape in freely supporting relation thereon at the area thereof positioned within said furnace, and an intermediately-disposed thermal expansion-measuring and mechanically-responsive element in freely-sliding contact between said test specimen and said thermal expansion-measuring, electrically-activated means to thereby ensure the production of a voltage by said last-named means directly proportional to the degree of movement imparted to said thermal expansion-measuring and mechanically-responsive element by the thermal expansion being given to the test specimen on activation of the said furnace; said intermediately-disposed, furnace-support means incorporating a slidably-mounted plate member directly supporting the furnace in slidable relation relative thereto to thereby facilitate the repositioning of said furnace and the test specimen-enclosing and vacuum sealing means fixedly supported thereto between a first, testing position and a second, non-testing position exposing and thus enabling the rapid placement of the selected test specimen in, the removal thereof from its support by the test specimen-holding means; said base support means housing vacuum head-plate means supported in upright position thereon in intermediate relation between said furnace and said evacuated means; said upright plate means having openings therein for rigidly supporting in extending and sealing relation therethrough the ends of both of said test specimen-enclosing and vacuum sealing and holding means, and said intermediately-disposed thermal expansion-measuring mechanically-responsive element extending into said evacuated means; said evacuated means comprising a bell jar having a front end portion disposed in sealed relation against, and thereby being supported by said vacuum head-plate means; said last-named means constituting an enlarged brass plate providing rigid support for both of said bell jar and the ends of said test specimen-enclosing and vacuum sealing means, said test specimen-holding means and said intermediately-disposed, thermal expansion-measuring and mechanically-responsive element; and further incorporating a combined compression fitting and O-ring sealing means arranged in surrounding relation to said test specimen-enclosing and vacuum sealing means; said last-named means comprising a relatively elongated and evacuated tube having one end thereof disposed in sealing relation to said enlarged brass plate by said compression fitting and O-ring sealing means, the latter means incorporating a quick release mechanism adjustable between a closed and an open position to thereby facilitate the release of the end of said evacuated tube therefrom, and the slidable positioning of said slidably-mounted plate member and the furnace mounted thereto to the non-testing position; said test specimen-holding means comprising a pair of relatively elongated quartz bar members supported in contacting and parallel relation to each other in a cradle-type configuration, within said enclosure tube, and each extending from one end portion within the furnace to an opposite end portion overlapping the end of said enclosure tube and disposed within said evacuated bell jar in relatively close proximity to, and operatively contacting said thermal expansion-measuring, electrically-activated means.

2. In a dilatometer apparatus as in claim 1, wherein said pair of relatively elongated quartz bar members are disposed in fused relation to each other, and the intermediately-disposed, thermal expansion-measuring and mechanically-responsive element comprises a relatively elongated, quartz push rod resting in slidable manner on top of said pair of fused bar members comprising said test specimen-holding means and extending from an inner end portion in direct contact with one side/end of the test specimen, to an outer end portion disposed within said evacuated bell jar in overlapping relation to the ends of said pair of fused bar members, and in direct and operative contact with said thermal expansion-measuring, electrically-activated means.

3. In a dilatometer apparatus as in claim 2, said thermal expansion-measuring, electrically-activated means comprising a linear variable differential transformer having a movable core element in point contact with, and movable by said push rod to thereby produce a voltage directly proportional to the degree of movement being imparted to said push rod by the thermal expansion of the test specimen. of work under a NASA contract and is subject to the provisions of

* * * * *